(12) United States Patent
Chu et al.

(10) Patent No.: US 10,839,226 B2
(45) Date of Patent: Nov. 17, 2020

(54) NEURAL NETWORK TRAINING

(71) Applicant: International Business Machines Corporation, Armonk, NY (US)

(72) Inventors: Stephen Mingyu Chu, Beabercreek, OH (US); Peng Gao, Beijing (CN); Chang Sheng Li, Beijing (CN); Dong Sheng Li, Shanghai (CN); Junchi Yan, Shanghai (CN); Weipeng Zhang, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 452 days.

(21) Appl. No.: 15/348,633

(22) Filed: Nov. 10, 2016

(65) Prior Publication Data

US 2018/0129917 A1    May 10, 2018

(51) Int. Cl.
*G06K 9/00* (2006.01)
*G06N 3/08* (2006.01)

(52) U.S. Cl.
CPC ........... *G06K 9/00758* (2013.01); *G06N 3/08* (2013.01)

(58) Field of Classification Search
CPC ........ G06K 9/66; G06K 9/52; G06K 9/00335; G06K 9/00758; G06K 9/00765; G06K 9/6256
See application file for complete search history.

(56) References Cited

U.S. PATENT DOCUMENTS

| | | | | |
|---|---|---|---|---|
| 10,163,227 | B1* | 12/2018 | Lester | G06T 9/002 |
| 2003/0235332 | A1* | 12/2003 | Moustafa | G06K 9/3208 |
| | | | | 382/157 |
| 2004/0135788 | A1* | 7/2004 | Davidson | G06T 17/00 |
| | | | | 345/530 |
| 2007/0074115 | A1* | 3/2007 | Patten | G11B 27/032 |
| | | | | 715/716 |
| 2007/0255496 | A1* | 11/2007 | Fong | G01S 19/42 |
| | | | | 701/469 |
| 2008/0019564 | A1* | 1/2008 | Murata | G01S 19/48 |
| | | | | 382/103 |
| 2008/0159622 | A1* | 7/2008 | Agnihotri | G06K 9/4628 |
| | | | | 382/157 |
| 2008/0219516 | A1* | 9/2008 | Suzuki | G06K 9/00228 |
| | | | | 382/118 |
| 2011/0150301 | A1* | 6/2011 | Song | G06K 9/00288 |
| | | | | 382/118 |

(Continued)

FOREIGN PATENT DOCUMENTS

CN    104992347    10/2015

*Primary Examiner* — Shaghayegh Azima
(74) *Attorney, Agent, or Firm* — Amin, Turocy & Watson, LLP

(57) ABSTRACT

Techniques for neural network training are provided. One computer-implemented method comprises: obtaining, by an electronic device operatively coupled to a processing unit, based on a similarity between two images, a first image and a second image. The computer-implemented method also comprises training, by the electronic device, a neural network based on the first image and the second image such that a distance between a first vector and a second vector generated respectively from the first image and the second image in the trained neural network is associated with the similarity.

11 Claims, 9 Drawing Sheets

(56) References Cited

U.S. PATENT DOCUMENTS

| | | | | |
|---|---|---|---|---|
| 2011/0243457 A1* | 10/2011 | Miyajima | G01C 21/3602 | 382/209 |
| 2013/0101271 A1* | 4/2013 | Urushihara | H04N 21/4347 | 386/248 |
| 2013/0121584 A1* | 5/2013 | Bourdev | G06K 9/00281 | 382/190 |
| 2013/0301723 A1* | 11/2013 | Abe | H04N 19/172 | 375/240.13 |
| 2014/0044361 A1* | 2/2014 | Lee | G06K 9/481 | 382/201 |
| 2014/0166855 A1* | 6/2014 | Fujiki | H04N 5/2353 | 250/208.1 |
| 2016/0093048 A1* | 3/2016 | Cheng | G06K 9/6289 | 382/131 |
| 2016/0180151 A1* | 6/2016 | Philbin | G06K 9/6218 | 382/118 |
| 2016/0196479 A1* | 7/2016 | Chertok | G06K 9/6272 | 382/156 |
| 2016/0379091 A1* | 12/2016 | Lin | G06K 9/00724 | 382/156 |
| 2017/0024611 A1* | 1/2017 | Bourdev | G06N 3/08 | |
| 2017/0076152 A1* | 3/2017 | Asl | G06N 3/0454 | |
| 2017/0105005 A1* | 4/2017 | Chen | H04N 19/159 | |
| 2017/0124428 A1* | 5/2017 | Han | G06K 9/00288 | |
| 2017/0132468 A1* | 5/2017 | Mosher | G06T 7/246 | |
| 2017/0147892 A1* | 5/2017 | Ishii | G06K 9/2054 | |
| 2017/0168498 A1* | 6/2017 | Nakajima | G05D 1/0088 | |
| 2017/0286415 A1* | 10/2017 | Kumar | G06F 16/434 | |
| 2017/0294000 A1* | 10/2017 | Shen | G06T 7/90 | |
| 2018/0053293 A1* | 2/2018 | Ramalingam | G06T 7/33 | |
| 2018/0063440 A1* | 3/2018 | Kopf | G06T 5/002 | |
| 2018/0137389 A1* | 5/2018 | Mathieu | G06K 9/00718 | |

* cited by examiner

NEURAL NETWORK TRAINING

BACKGROUND

The subject disclosure relates to data processing, and more specifically, to neural network training.

SUMMARY

The following presents a summary to provide a basic understanding of one or more embodiments of the disclosure. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate neural network training are described.

In one aspect, a computer-implemented method is proposed. The computer-implemented method can comprise obtaining, by an electronic device operatively coupled to a processing unit, based on a similarity between two images, a first image and a second image. The computer-implemented method can also comprise training, by the electronic device, a neural network based on the first image and the second image and such that a distance between a first vector and a second vector generated respectively from the first image and the second image in the trained neural network is associated with the similarity.

In another aspect, an electronic device is proposed. The electronic device can comprise: at least one processing unit; and a memory operatively coupled to the at least one processing unit and that stores computer executable instructions that, based on execution by the at least one processing unit, facilitate performance of acts. The acts can comprise obtaining, based on a similarity between two images, a first image and a second image. The acts can also comprise training a neural network based on the first image and the second image, such that a distance between a first and a second vector generated respectively from the first image and the second image in the trained neural network being associated with the similarity.

In yet another aspect, a computer program product for neural network training is proposed. The computer program product can comprise a computer readable storage medium having program instructions embodied therewith. The program instructions can be executable by an electronic device to cause the electronic device to perform following acts. The acts can comprise obtain, by the electronic device, based on a similarity between two images, a first image and a second image; and train, by the electronic device, a neural network based on the first image and the second image such that a distance between a first vector and a second vector generated, respectively from the first image and the second image in the trained neural network is associated with the similarity.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Throughout the drawings, the same or similar reference numerals represent the same or similar elements

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

As used herein, the terms "includes" and its variants are to be understood as open-ended terms that mean "includes, but is not limited to." The term "based on" is to be understood as "based at least in part on." The term "one embodiment" and "an embodiment" are to be understood as "at least one embodiment." The term "another embodiment" is to be understood as "at least one other embodiment." Other definitions, explicit and implicit, may be included below.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Neural networks are becoming increasingly popular in various aspects of problem solving. In training the neural network, a large number of samples are typically required. For example, in training a neural network for image recognition, sample images of various types of objects may be provided. To teach the neural network to recognize a certain type of image such as a cat, a great number of images with cats can be provided. In training the neural network, parameters in the neural network can be adjusted such that the trained neural network can output a result of "cat" in response to those sample images and/or other images of cats being input.

In additional to image recognition, the neural networks can solve various types of problems. For example, with deep learning techniques, complex problems can be described by images and those images can be processed by the neural networks to learn knowledge for solving the problems. For example, in an application of "playing chess," a user and the application installed in a computing device can move chess pieces in turn. In this example, the chessboard and the chess pieces in respective turns can be considered as respective images. By using sample images of historical games and/or the respective scores of these games, the neutral network can be trained for calculating a next move.

Although some solutions have been proposed to train the neural network, a huge number of (for example, millions of) sample images are typically required to improve the likelihood that the trained neural network outputs a reliable result. Accordingly, it is desirable to be able to train neural networks with a reasonable number of sample images.

Figure 1:
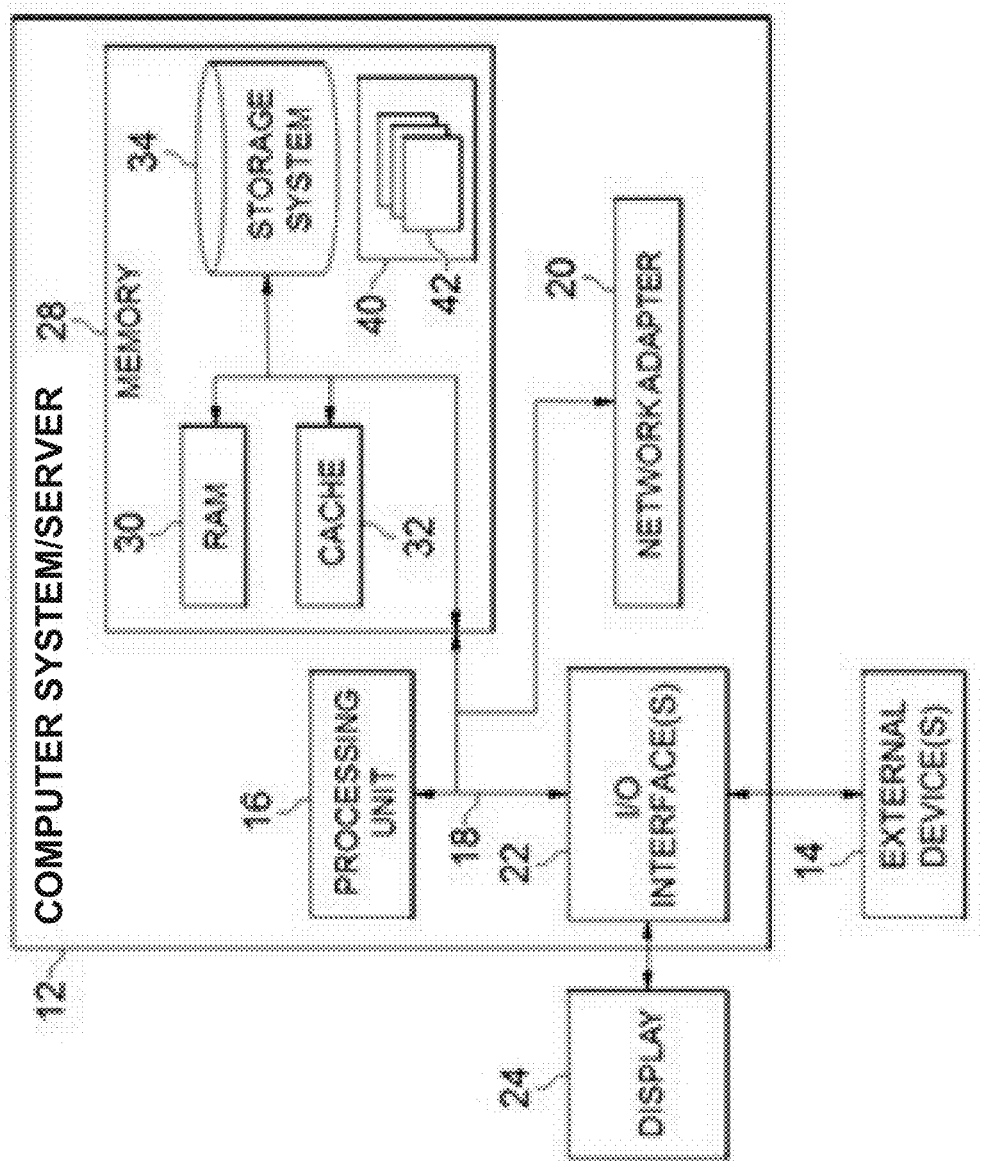
FIG. 1 illustrates a block diagram of an example, non-limiting computer system/server 12 that present disclosure can be implemented in accordance with one or more embodiments described herein.

FIG. 1 illustrates a block diagram of an example, non-limiting computer system/server 12 that present disclosure can be implemented in accordance with one or more embodiments described herein. The electronic device can be or include the computer system/server 12 in some embodiments. The computer system/server 12 can be employed to implement one or more of the embodiments of the present disclosure. Computer system/server 12 is only illustrative and is not intended to suggest any limitation as to the structure of the electronic device and/or the scope of use or functionality of embodiments of the disclosure described herein.

The components of computer system/server 12 can include, but are not limited to, one or more processing units 16, a system memory 28, and a bus 18 that couples various system components including system memory 28 to processing unit 16. As used herein, the term "processing unit" should be understood to be interchangeable with the term "processor."

Bus 18 can represent one or more of any of several types of bus structures, including a memory bus or memory controller, a peripheral bus, an accelerated graphics port or a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

Computer system/server 12 typically includes a variety of computer system readable media. Such media can be any available media that is accessible by computer system/server 12, and it can include both volatile and non-volatile media, as well as removable and non-removable media.

System memory 28 can include computer system readable media in the form of volatile memory, such as random access memory (RAM) 30 and/or cache memory 32. Computer system/server 12 can further include other removable or non-removable, volatile or non-volatile computer system storage media. By way of example only, storage system 34 can be provided for reading from and/or writing to a non-removable, non-volatile magnetic media (not shown and typically called a "hard drive"). Although not shown, a magnetic disk drive for reading from and/or writing to a removable, non-volatile magnetic disk (e.g., a "floppy disk"), and an optical disk drive for reading from and/or writing to a removable, non-volatile optical disk such as a compact disc read-only memory (CD-ROM), digital versatile disc-read only memory (DVD-ROM) or other optical media can be provided. In such instances, one or more of the disk drives can be connected to bus 18 by one or more data media interfaces. As will be further depicted and described below, memory 28 can include at least one computer program product having a set of (or, in some embodiments, at least one) computer program modules that are configured to carry out the functions of one or more of the embodiments of the disclosure.

Program/utility 40, having a set or (or, in some embodiments, at least one) program modules 42, can be stored in memory 28. By way of example, and not limitation, other aspects that can be stored in memory 28 can include an operating system, one or more application programs, other program modules, and program data. The operating system, one or more application programs, other program modules, and/or program data or some combination thereof can include an implementation of a networking environment. Program modules 42 can generally carry out the functions and/or methodologies of one or more embodiments of the disclosure as described herein.

Computer system/server 12 can also communicate with one or more external devices 14 (e.g., a keyboard, a pointing device, a display 24), one or more devices that enable a user to interact with computer system/server 12 and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN) and/or a public network (e.g., the Internet) via network adapter 20. As depicted, network adapter 20 can communicate with the other components of computer system/server 12 via bus 18. It should be understood that although not shown, other hardware and/or software components can be used in conjunction with, or included within, computer system/server 12. Examples, include, but are not limited to: microcode, device drivers, redundant processing units, external disk drive arrays, redundant array of independent disks (RAID) systems, tape drives, and/or data archival storage systems.

It is appreciated that the computer system/server 12 as illustrated in FIG. 1 is only an example of the computing device in which the embodiments of the present disclosure can be implemented. In one embodiment, the embodiments of the present disclosure can be implemented in a distributed computing system, for example, in a cloud computing environment.

In the present disclosure, embodiments are described by taking an image recognition neural network as an example neural network. Those skilled in the art can understand that, principles of the embodiments of the present disclosure can be modified and implemented in another neural network for solving another problem, such as chess playing, as well as other applications in the field of artificial intelligence.

Figure 2:
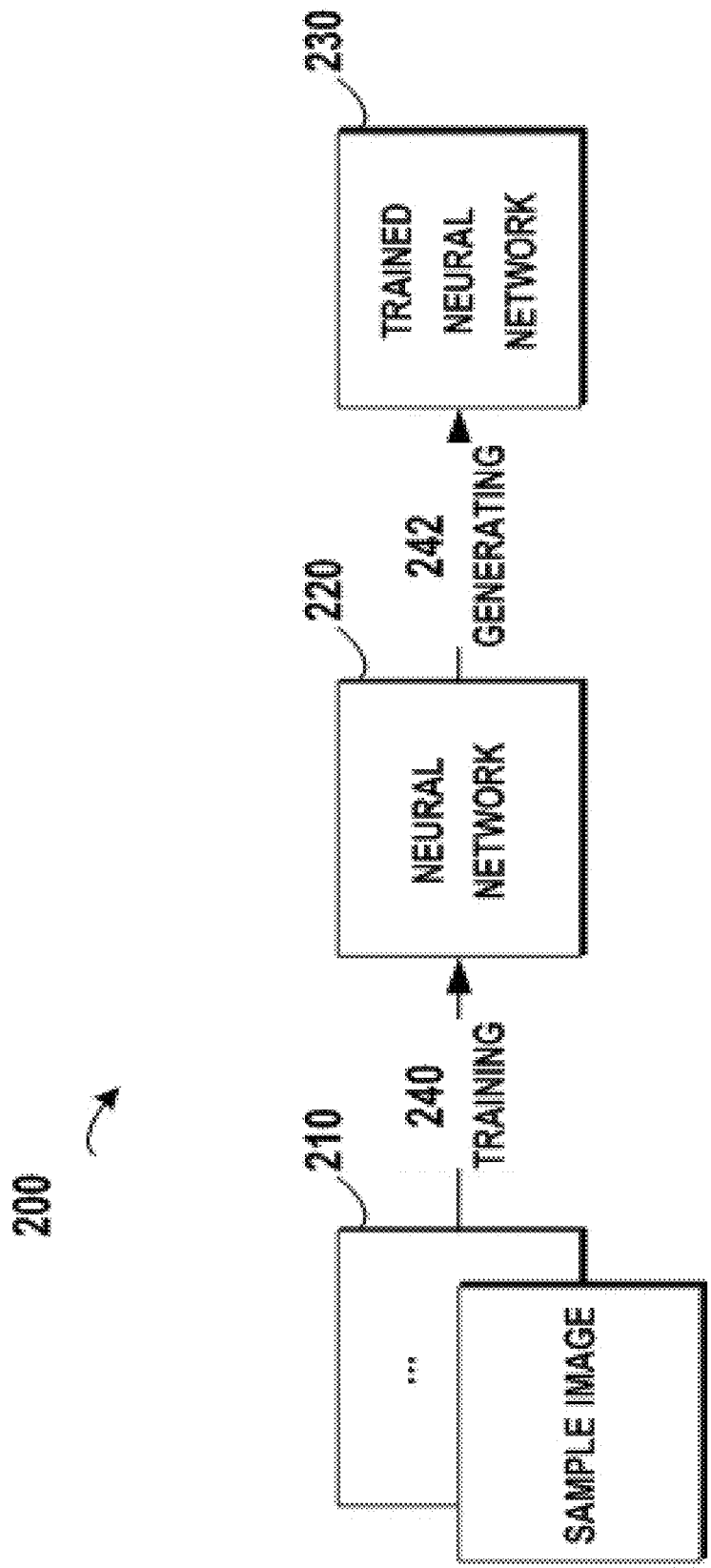
FIG. 2 illustrates a block diagram of an example, non-limiting technical solution for training a neural network that present disclosure can be implemented in accordance with one or more embodiments described herein.

FIG. 2 illustrates a block diagram 200 of an example, non-limiting technical solution for training a neural network that present disclosure can be implemented in accordance with one or more embodiments described herein.

As illustrated in FIG. 2, a number of individual sample images 210 can be provided for training a neural network 220. In this block diagram, each of these sample images 210 is classified into a type in advance. In other embodiments, one or more of the sample images 210 are classified into a type in advance. Taking an image recognition neural network as an example, a portion of the sample images 210 can be classified as a "cat," a portion of the sample images 210 can be classified as a "dog," and so on. In each round of the training 240 (or, in some embodiments, in one or more rounds of training), a single image can be provided to train the neural network 220, and the neural network 220 can gradually learn 242 the common features of each type (or, in some embodiments, one or more types) such as the type of the "cat" and "dog." The trained neural network 230 can classify an image with an animal into a corresponding type.

In order to obtain a reliable neural network, the number of the sample images 210 usually reaches an order of one million. Considering the drawbacks of the existing approaches to reducing the number of the sample images 210, one or more embodiments described herein propose a computer-implemented method for training the neural network. In the computer-implemented method, based on a similarity between two images, a first and a second image can be obtained. Then, a neural network can be trained based on the first and second images such that a distance between a first and a second vector generated respectively from the first and second images in the trained neural network is associated with the similarity.

Figure 3:
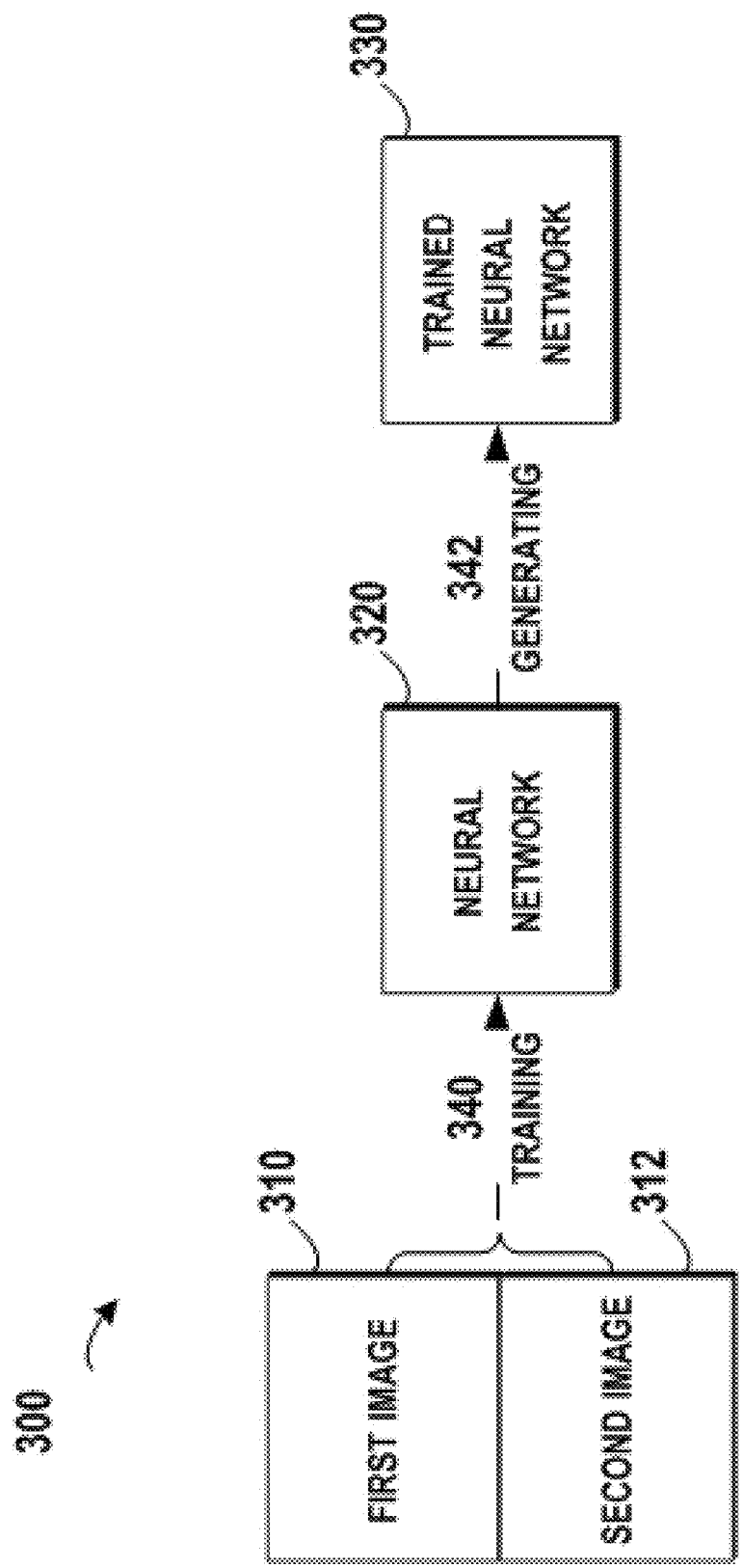
FIG. 3 illustrates a block diagram of an example, non-limiting computer-implemented method for training a neural network in accordance with one or more embodiments described herein.

FIG. 3 illustrates a block diagram 300 of an example, non-limiting computer-implemented method for training a neural network in accordance with one or more embodiments described herein. Compared with the existing approaches, one or more embodiments of the present disclosure can utilize multiple images (for example, a first image 310 and a second image 312) instead of a single image in each round (or, in some embodiments, in one or more rounds) of the training. It is to be appreciated that a similarity between the first and second images is considered in this embodiment. For example, the two images can be similar images such as images of a same car taken at different angles; alternatively, the content of the two images can be totally different, such as images of a car and a house.

In 340, the neural network 320 can be trained by the first image 310 together with the second image 312 in one round of the training. As the similarity between the two images is known in advance in some embodiments, the types that the two images are classified into by the neural network can be also known. Specifically, if two images of the same object are used as the sample images in one round, then the neural network can be trained in a manner that the trained neural network outputs the same result such as a "car" type if the two images are inputted. Further, if two images of different objects (e.g., a car, a house) are taken as the sample images in another round, then the neural network should be trained in a manner that the trained neural network outputs different results such as a "car" type and a "house" type.

After several rounds of training, a trained neural network 330 can be generated at 342. In the embodiment of FIG. 3, a pair of images with known similarity therebetween can be used as sample images in each round of the training (or, in some embodiments, in one or more rounds of training), and thereby the trained neural network can output respective results that are associated with the similarity. Usually, the result of the neural network by processing the image can be measured by a classification of a vector generated from the image by the neural network, and thereby the distance between a first and a second vector generated from the first and second images in the trained neural network can be determined for quantizing the difference between the two results.

Figure 4:
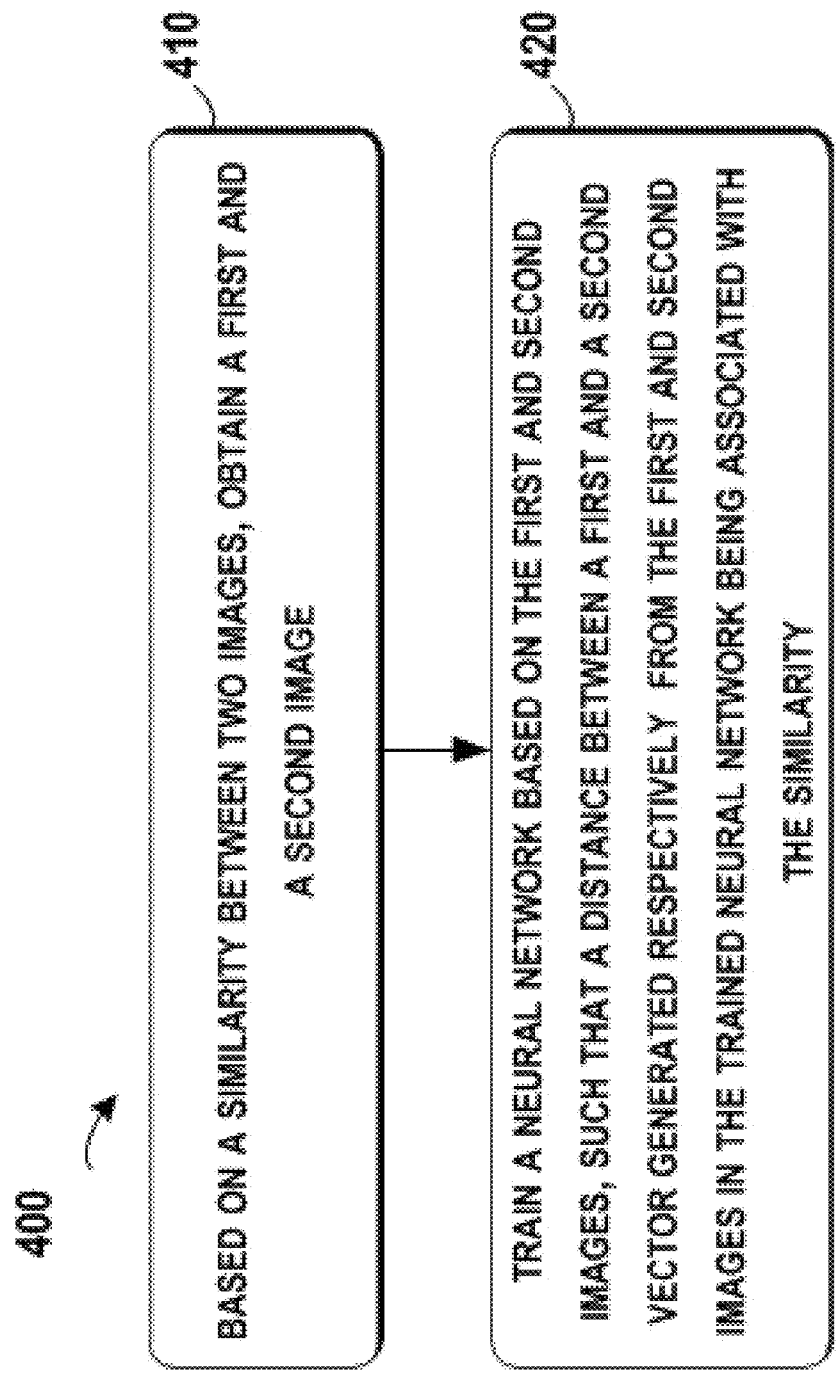
FIG. 4 illustrates a flowchart of an example, non-limiting computer-implemented method for training a neural network in accordance with one or more embodiments described herein.

FIG. 4 illustrates a flowchart 400 of an example, non-limiting computer-implemented method for training a neural network in accordance with one or more embodiments described herein. In 410, based on a similarity between two images, a first and a second image can be obtained. In the context of the present disclosure, multiple images can be used in facilitating the neural network training, and then the types of the content of the multiple images can be considered. In this disclosure, the term "similarity" can refer to the similarity between the content of the images. For example, the similarity between two images of the same car taken at different angles can be defined as "True" or "1" to indicate that the content of the two images are the same. For another example, the similarity between an image of a car and an image of a house can be defined as "False" or "0" to indicate that the content of the two images are totally different.

It is to be appreciated that the above values of "1" and "0" are only examples of the representation of the similarities. In another embodiment, the similarity can be represented by other values selected from another numerical range such as [0, 100]. In yet another embodiment, the similarity can be represented by a diversity factor, which can show the difference degree between the content of the two images.

In 420, a neural network can be trained based on the first and second images such that a distance between a first and a second vector generated respectively from the first and second images in the trained neural network is associated with the similarity. Also, the distance between the first and second vectors can be determined for comparing the results of the trained neural network for the first and second images. Moreover, if two images of the same car are used, then the neural network can be trained such that the first vector generated from the first image and the second vector generated from the second image are classified into the same type of "car." In other words, both of the first and second vectors can fall into a cluster associated with the type "car." As the definition of the cluster can be dependent on the common features of the car, the distance between the first and second vectors can be within the scope of the cluster.

In this embodiment, the type of the cluster can be of various granularities. In one example, the type "car" can indicate that images that are classified into this type should have the same model but can have different colors. In another example, the type "car" can be further partitioned into sub-types such as the "red car," the "blue car," and so on. Accordingly, the images that are classified into each sub-type can have the same model and the same color. In various embodiments, the computer-implemented method of FIG. 4 can be modified by setting the similarity to other values with a higher precision. For example, when both the model and the color are considered, the similarity between the images of a red car and a blue car with the same model can be represented as "0.9," and the similarity between the images of a car with the same model and color can be represented as "1."

Also, the method for generating the first and second vector by the neural network from the first and second image respectively can be similar to what is adopted in a traditional neural network and details may be omitted in the present disclosure. Further, although the first and second images are used as sample images, more than two images can be used in one round of training. If more than two images are used in the training, then the similarities between each pair of images (or, in some embodiments, one or more pair of images) can be considered and the rules for the training with each pair of images (or, in some embodiments, one or more pair of images) can be consistent with what is described at 420.

In one embodiment of the present disclosure, the first and second images having the similarity greater than a first similarity can be selected, where the distance between the first and second vectors can be less than or equal to a first distance threshold. In this embodiment, the first distance threshold can be inversely proportional to the first similarity.

The above embodiment illustrates a situation in which two similar images are used as sample imaging in one round of the training. In this embodiment, the distance between the two vectors generated respectively from the two similar images can be inversely proportional to the similarity between the two similar images. In other words, in this embodiment, the greater the similarity is, the lesser the distance is. In training the neural network, the parameters can be configured with the values that can classify two similar images into a same type. Specifically, the distance between the two vectors generated according to these values can be less than or equal to a defined first distance threshold. In the training, the values of the parameters of the neural network can be adjusted according to one or more existing methods or approaches.

Figure 5A:
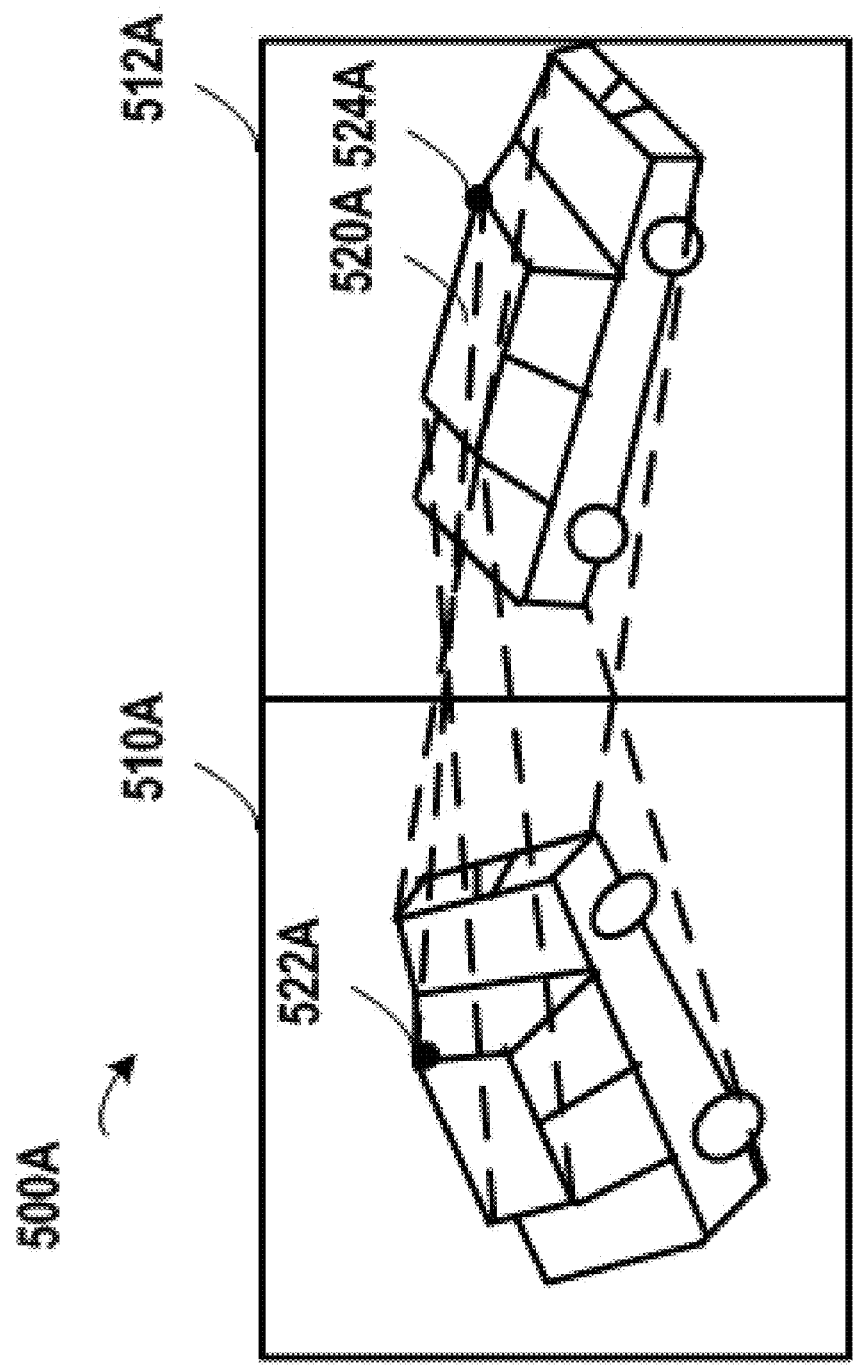
FIG. 5A illustrates an example, non-limiting pair of images with a high similarity for training a neural network in accordance with one or more embodiments described herein.
Figure 5B:
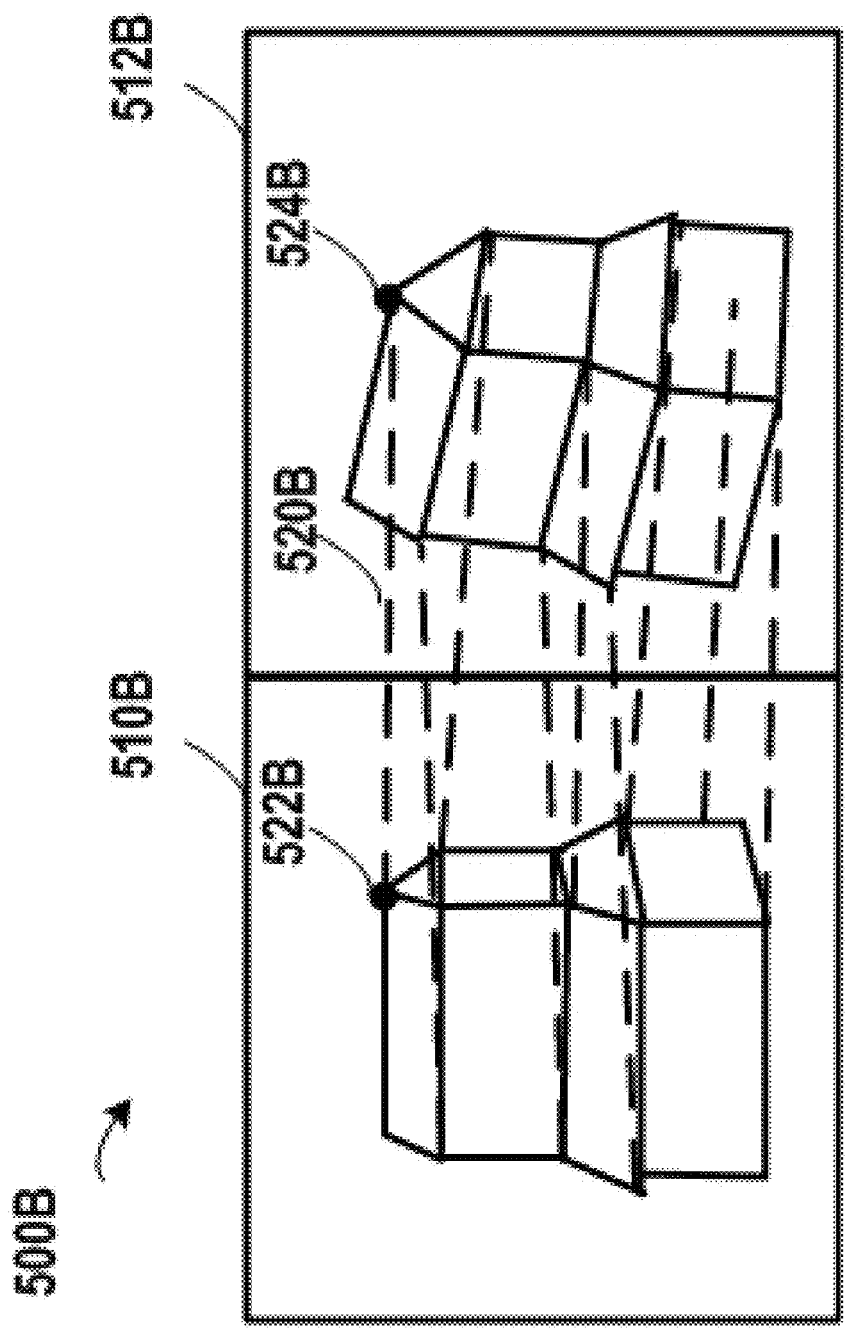
FIG. 5B illustrates another example, non-limiting pair of images with a high similarity for training a neural network in accordance with one or more embodiments described herein.
Figure 6:
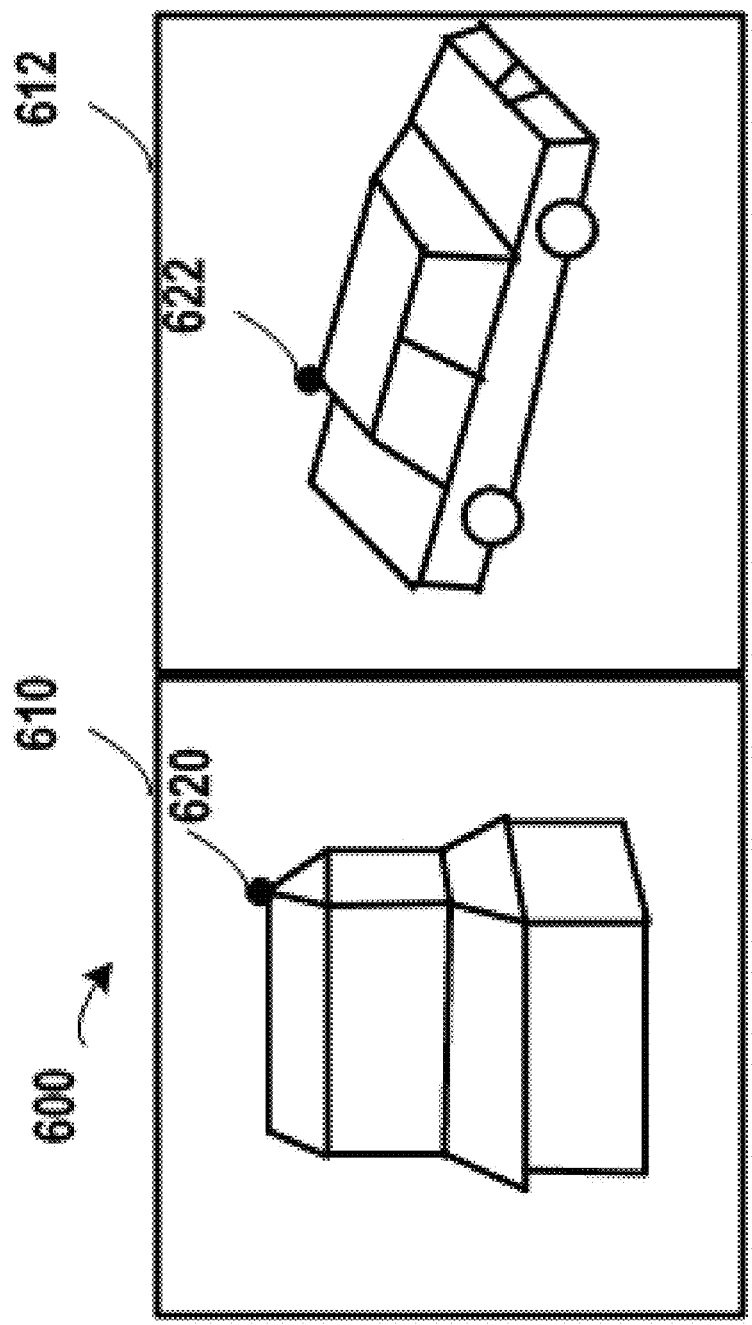
FIG. 6 illustrates an example, non-limiting pair of images with a low similarity for training a neural network in accordance with one or more embodiments described herein.

Reference will be made to FIGS. 5A, 5B and 6 to describe how to select the first and second images according to the one or more embodiments of the present disclosure. FIG. 5A illustrates an example, non-limiting pair of images with a high similarity for training a neural network in accordance with one or more embodiments described herein. FIG. 5B illustrates another example, non-limiting pair of images with a high similarity for training a neural network in accordance with one or more embodiments described herein.

In FIG. 5A, a pair 500A of images 510A and 512A is illustrated in which the two similar images are images of a same car taken at different angles. The pair of images can be used as sample images in one round of the training. Further, another pair 500B of images 510B and 512B is illustrated in FIG. 5B in which the two similar images are images of a same house taken at different angles. The pair of images can be used as sample images in another round of the training.

With embodiments of the present disclosure, at least two sample images can be used in one round of the training. Because the similarity between the two sample images meets a certain rule (for example, being greater than or equal to a defined similarity), the output results of the trained neural network can be compared and used as feedback for adjusting the parameters in the trained neural network. Accordingly, the pair of two sample images can provide further knowledge about the training, and thus fewer sample images can be involved and time cost for the training can be decreased. In the above embodiment, the value of the first distance threshold can be determined according to the definition of the cluster and the threshold can be adjusted according to the specific environment of the neural network.

In one embodiment of the present disclosure, the first and second images with the similarity between the first and second images being less than or equal to a second similarity can be selected, the distance between the first and second vectors can be greater than or equal to a second distance threshold, and the second distance threshold can be inversely proportional to the second similarity.

In one embodiment of the present disclosure, whether the similarity between two images is high or low can be determined according to the following acts. First, a first set and a second set of feature points can be extracted from a first and a second candidate images, respectively. Then, point alignment can be performed among the extracted first and second sets of feature points. Next, if a graph matching occurs between the first and second candidate images based on the point alignment, then it is determined that the similarity between the two candidate images is qualified and thus the first and second candidate images can be selected as the sample images.

Referring to FIG. 5A, the feature points 522A and 524A can be extracted from the images 510A and 512A, respectively. In this embodiment, the images 510A and 512A are candidate images, and a plurality of extraction algorithms can be implemented for extracting the feature points from the candidate images. One or more existing approaches and/or other approaches that will be developed in the future can be employed. As illustrated in this FIG. 5A, the point alignment can be performed between the exacted feature points 522A and 524A. The line 520A connecting the feature points 522A and 524A shows the alignment between the two points, and thereby it is determined that the feature point 522A in the image 510A is a point corresponding to the feature point 524A in the image 512A.

According to a defined granularity, a plurality of feature points can be extracted from the images 510A and 512A. By the alignment among these extracted feature points, a graph match can be determined between the images 510 and 512, and thereby the two images can be selected for training the neural network. Based on the point alignment, a plurality of graph matching algorithms can be implemented.

In one embodiment of the present disclosure, the characteristic points of each main component of the car (or, in some embodiments, in some main components of the car), for example points in the frame and around the wheels of the car, can be extracted as the feature points. The interval among these points can be determined according to the complexity of the content of the images, the resolution of the images and/or other aspects of the images.

Referring to FIG. 5B, the feature points 522B and 524B can be extracted from the candidate images 510B and 512B respectively, and the line 520B connecting the feature points 522B and 524B can show the alignment between the two feature points. Although only the tip of the tower in the house is illustrated as an example feature points, other points in the images can be extracted to determine whether a graph match occurs between the images 510B and 512B. In response to a graph match, the two images can be selected for the training.

FIG. 6 illustrates a block diagram 600 of an example, non-limiting pair of images with a low similarity for training a neural network in accordance with one or more embodiments described herein. As illustrated in FIG. 6, two images 610 and 612 with different content are provided. In this example, the feature points 620 and 622 are extracted from the images 610 and 612, respectively. However, these feature points 620 and 622 cannot be aligned and thus the house in the image 610 and the car in the image 612 cannot match. Then, it can be determined that the object of the images 610 and 612 are totally different. In training the neural network, if the current neural network classifies the house and the car into the same type, then such indicates that the parameters in the neural network are not well trained and should be corrected to the values that can classify the house and the car into a "house" type and a "car" type.

In one embodiment of the present disclosure, an object can be identified from a plurality (or, in some embodiments, series) of images that include the object and are generated at different viewpoints around the object. Then, the first and second images can be selected from the plurality or series of images.

In this embodiment, the plurality or series of images can be a photo album including images that are taken from different angles around an object. For example, in order to train the neural network to learn the knowledge of a car, a plurality of images can be taken to the car at different viewpoints to form an album of. the car. Then, as all the images in the album are of the same car, the similarities between any two images are high and thus any two images can be selected from the album. At this point, the similarity between the selected two images can certainly be greater than or equal to the first similarity because the two images show the same car. Then the two images can be used in training the neural network and the selected images are similar to the examples as illustrated in FIGS. 5A and 5B. Further, in some embodiments, the neural network can be trained such that the trained neural network can classify the two images into a same type.

In another embodiment of the present disclosure, more albums including images with different objects can be provided. For example, a photographer can take photos at a car from different angles of the car to form a car album, and can also take photos at a house around the house to form a house album. Then, one image can be selected from the car album and another image can be selected from the house album to generate a pair of images. Then the two images can be used in training the neural network and the selected images are similar to the example as illustrated in FIG. 6. Further, if the neural network fails to classify the two images into correct types, then the neural network can be trained such that the trained neural network can classify the two images into a "house" type and a "car" type.

In one embodiment of the present disclosure, the plurality or series of images can be frames that are included in a video fragment (e.g., a video fragment that is targeting a certain object). In this embodiment, movement of the object can be tracked in the frames according to a timeline of the video fragment. In order to provide a rich resource of the images for the training, a video fragment can be taken at a target object. For example, in order to prepare the sample images for the car recognition, a video fragment of a car racing from a sports television (TV) channel can be used. As the video fragment traces the car from various viewpoints during the racing and provides rich details of the car at almost all the possible angles around the car, two frames in the video fragment can be selected to train the neural network with the knowledge about the car.

In one or more video fragments, the location and the orientation of the object can change along the timeline of the video fragment, and thus the object can be tracked to select more appropriate images that can provide accurate knowledge for identifying a car. Usually, the frame rate of the video can be 25 frames per second (fps), which means one second of the video can comprise 25 frames. Thereby the successive frames in the video fragment can be almost the same and the slight difference there between can not be significant enough for the training.

Generally, separated frames (for example, a frame at the beginning of the video fragment and a frame at the end) can have enough difference and provide rich knowledge for the training, and thereby the frames spaced with a certain time duration can be selected. In one embodiment of the present disclosure, the first and second images can be selected based on the timeline in response to a time difference between the first and second images in the video fragment being greater than or equal to a defined period.

Figure 7:
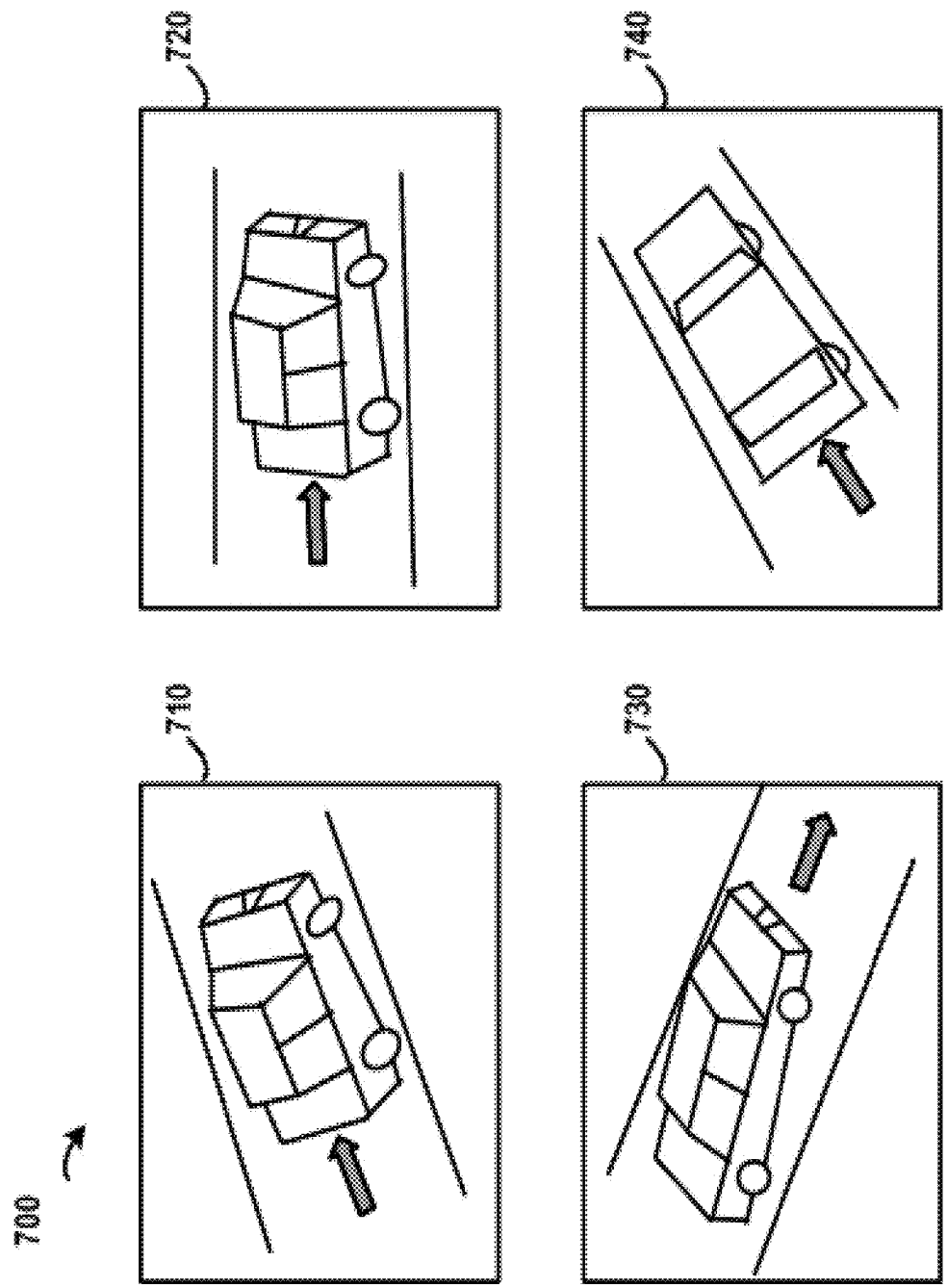
FIG. 7 illustrates an example, non-limiting plurality of images included in a video fragment for training a neural network in accordance with one or more embodiments described herein.

FIG. 7 illustrates a block diagram 700 of an example, non-limiting plurality of images included in a video fragment for training a neural network in accordance with one or more embodiments described herein. As illustrated in FIG. 7, the images 710, 720, 730 and 740 are typical frames from a car racing video, and these images are shown according to the chronological order in the timeline. For example, the image 710 can be a frame at the 1st second in the video fragment, and the images 720, 730 and 740 can be at the 2nd second, the 11$^{th}$ second and the 15$^{th}$ second, respectively.

In this figure, the images 710 and 720 are frames with a small time difference such as 1 second. Those skilled in the art can understand that the attitudes of the car in the images 710 and 720 are similar and the shooting angles are of a slight difference, and thereby the images 710 and 720 are not appropriate for the training. Further, the images 730 and 740 are frames near the end of the video fragment, and the attitudes of the car are different of those of the images 710 and 720 thereby much more details of the car can be provided. In this figure, the images 710 and 730 (with a time difference of 10 seconds) can be selected as a pair of sample images, the images 710 and 740 (with a time difference of 14 seconds) can be selected as a pair. Likewise, images 720 and 730, images 720 and 740 can also be selected for training the neural network.

In addition to the example of selecting the frames with enough time difference, the frames can be selected based on another rule. For example, the position and the orientation of the object can be tracked in the video fragment, and the frames with the enough position and orientation offset can selected for the training.

The above paragraphs of the present disclosure describe the embodiments in which two images are selected as the sample images for one round of the training. In other embodiments of the present disclosure, more than two images can be used for training the neural network. For example, a group of three similar images such as the images 710, 730 and 740 can be selected. In another example, the group can include an image in which the content is totally different from those of the remaining images in the group.

In one embodiment of the present disclosure, a third image can be obtained in which the similarity between the third image and the first or the second image can be less than or equal to a second similarity. Then, the neural network can be trained based on the third image such that a distance between a third vector generated from third image in the trained neural network and either of the first or second vectors can be greater than a second distance threshold. In this embodiment, more than two images are selected for the training and thus more knowledge about the objects (for example, the car and the house) can be provided to further reduce the time cost of the training.

Figure 8:
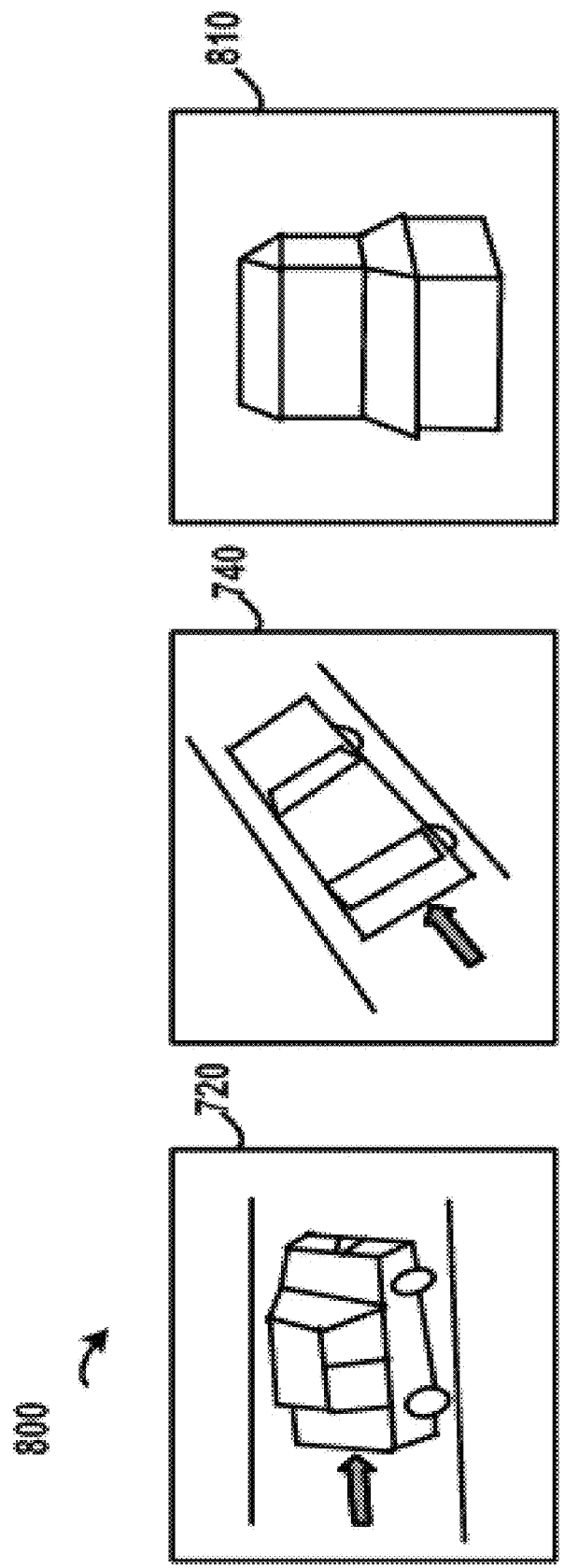
FIG. 8 illustrates an example, non-limiting plurality of images that can be used for training a neural network in accordance with one or more embodiments described herein.

FIG. 8 illustrates a block diagram 800 of an example, non-limiting plurality of images that can be used for training a neural network in accordance with one or more embodiments described herein. As illustrated in FIG. 8, the images 720 and 740 are two images of the car. Further, another image 810 with a different content can be added into the group. At this point, the images 720, 740 and 810 can act as sample images for one round of training. It is desired that the trained neural network can meet the following requirements: (1) classifying the images 720 and 740 to a "car" type, and (2) classifying the image 810 to a "house" type other than the "car" type. After the training, if the trained neural network cannot meet the above requirements, then such can indicate that the neural network is not well trained and the parameters in the neural network should be further adjusted.

Although FIG. 8 illustrates an example group that includes three images. However, it is to be appreciated that the number of the images and similarities among these images in the group can vary according to the specific configuration of the neural network. In one embodiment of the present disclosure, three totally different images can be selected. For example, three images including a car, a house and a tree respectively can be added into the group of sample images. At this point, the parameters in the neural network can be adjusted such that the trained neural network can classify the three images into three different types.

In another example, two images of a same car and two images of a same house can be added into the group. At this point, if the neural network cannot classify these images into correct types, then the parameters in the neural network can be adjusted such that the trained neural network can classify the two images of the car into the "car" type, and classify the two images of the house into the "house" type. In yet another example, those skilled in the art can select the images according to another rule as long as the selected images can be helpful in reducing the number of the sample images and increasing the performance of the training.

In one embodiment of the present disclosure, the third image can be selected in response to the third image being irrelevant to the object. In this example, the first and second images can be selected from images including the same object, and the third image can be selected from images including another object. Referring back to the example of providing the car album and the house album, the first and second images can be, for example, randomly selected from the car album, and the third images can be selected from the house album. At this point, the three selected images can act as the sample images in one round of the training.

In another embodiment of the present disclosure, the first and second images can be selected from frames of a video fragment (for example, a car racing video), and the third image can be selected from frames of another video fragment (for example, a concert video).

In the above embodiments, the video fragment usually includes thousands of frames and thus it is easy to select tens of pairs of sample images with high similarities. Those skilled in the art can adopt the existing approaches of image processing to select appropriate sample images for training the neural network. Compared with the traditional approach of manually identifying the types of the millions of sample images, one or more of the present embodiments can greatly reduce the number of the sample images as well as the manual workload involved in preparing the sample images.

According to one embodiment of the present disclosure, a computing system is proposed. The computing system comprises a computer processor coupled to a computer-readable memory unit, the memory unit comprising instructions that when executed by the computer processor implements a method. In the computer-implemented method, based on a similarity between two images, a first and a second image can be obtained. Then, a neural network can be trained based on the first and second images such that a distance between a first and a second vector generated respectively from the first and second images in the trained neural network is associated with the similarity.

In one embodiment of the present disclosure, the first and second images having the similarity greater than a first similarity can be selected, the distance between the first and second vectors generated according to the determined parameters can be less than a first distance threshold, and the first distance threshold can be inversely proportional to the first similarity.

In one embodiment of the present disclosure, a plurality and/or series of images that include an object and are generated at different viewpoints around the object can be identified. Then, the first and second images can be selected from the plurality or series of images.

In one embodiment of the present disclosure, the plurality or series of images can be frames that are included in a video fragment, and movement of the object can be tracked in the frames according to a timeline of the video fragment.

In one embodiment of the present disclosure, the first and second images can be selected based on the timeline, in response to a time difference between the first and second images in the video fragment being greater than or equal to a defined period.

In one embodiment of the present disclosure, a third image with a similarity between the third image and the first or the second image below a second similarity can be obtained. Then, the neural network can be trained based on the third image such that a distance between a third vector generated from third image in the trained neural network and either of the first vector or the second vector can be greater than or equal to a second distance threshold.

In one embodiment of the present disclosure, the third image can be selected in response to the third image being irrelevant to the object. In one embodiment of the present disclosure, a first set and a second set of feature points can be selected from the first image and the second image, respectively. Then, point alignment can be performed among the extracted first set of feature points and the extracted second set of feature points. Next, the first and second candidate images can be selected as the first and second images respectively in response to a graph match between the first and second candidate images based on the point alignment.

In one embodiment of the present disclosure, the first and second images with the similarity between the first and second images below a second similarity can be selected, the distance between the first vector and the second vector generated according to the determined parameters can be greater than or equal to a second distance threshold, and the second distance threshold can be inversely proportional to the second similarity.

According to one embodiment of the present disclosure, a computer program product is proposed. The computer program product is tangibly stored on a non-transient machine readable medium and comprising executable instructions which, when (or if) executed on an electronic device, cause the electronic device to: obtain a first and a second image based on a similarity between the first and second images; and train a neural network based on the first and second images such that a distance between a first vector and a second vector generated from the first image and the second image in the trained neural network is associated with the similarity.

In one embodiment of the present disclosure, the instructions can further cause the electronic device to: select the first and second images with the similarity above a first similarity, wherein the distance between the first and second vectors can be below a first distance threshold, and wherein the first distance threshold can be inversely proportional to the first similarity.

In one embodiment of the present disclosure, the instructions can further cause the electronic device to: identify an object from a plurality or series of images that include the object and are generated at different viewpoints around the object; and select the first and second images from the serial of images.

In one embodiment of the present disclosure, where the plurality or series of images are frames that are included in a video fragment, and the instructions can further cause the electronic device to track movement of the object in the frames according to a timeline of the video fragment.

In one embodiment of the present disclosure, the instructions can further cause the electronic device to select, based on the timeline, the first and second images in response to a time difference between the first and second images in the video fragment being greater than or equal to a defined period.

In one embodiment of the present disclosure, the instructions can further cause the electronic device to: obtain a third image with a similarity between the third image and the first or the second image below a second similarity; and train the neural network based on the third image such that a distance between a third vector generated from third image in the trained neural network and either of the first vector or the second vector is greater than a second distance threshold.

In one embodiment of the present disclosure, the instructions can further cause the electronic device to select the third image in response to the third image being irrelevant to the object. In one embodiment of the present disclosure, the instructions can further cause the electronic device to extract a first set and a second set of feature points from a first and a second candidate images, respectively; perform point alignment among the extracted first and second sets of feature points; and select the first and second candidate images as the first and second images respectively in response to a graph match between the first and second candidate images based on the point alignment.

In one embodiment of the present disclosure, the instructions can further cause the electronic device to select the first and second images with the similarity between the first and second images below a second similarity; and train the neural network comprising determining parameters in the neural network, wherein the distance between the first and second vectors can be above a second distance threshold, and wherein the second distance threshold can be inversely proportional to the second similarity.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

obtaining, by an electronic device operatively coupled to a processing unit, based on a similarity between two images, a first image and a second image;

training, by the electronic device, a neural network based on the first image and the second image and such that a distance between a first vector and a second vector generated respectively from the first image and the second image in the trained neural network is associated with the similarity;

wherein the obtaining the first image and the second images comprises selecting the first image and the second images via selecting, by the electronic device, based on a timeline in a video fragment, the first image and the second image in response to determination of a time difference between the first image and the second image in the video fragment being greater than or equal to a defined period;

wherein the obtaining the first image and the second images further comprises selecting the first image and the second image having the similarity greater than a first defined similarity;

wherein the distance between the first vector and the second vector is less than a first distance threshold, the first distance threshold being inversely proportional to the first similarity such that the greater the first similarity, the lesser the distance;

wherein the selecting the first image and the second image having the similarity greater than the first similarity comprises: identifying a plurality of images that include an object and are generated at different viewpoints around the object; and selecting the first image and the second image from the plurality of images;

wherein the plurality of images comprises frames included in a video fragment, and the identifying the plurality of images comprises: tracking, by the electronic device, movement of the object in the frames according to the timeline of the video fragment;

and determining, by the electronic device, that the first vector and the second vector are in a same cluster of a plurality of clusters, wherein the determining that the first vector and the second vector are in the same cluster is based on determining features that exist for the first image and the second image, the type of the cluster, the distance between the first vector and the second vector are within a defined set of values that are within the scope of the cluster, and a diversity factor for the first image and the second image, wherein a first value of the distance and a first diversity factor compared with the type of the cluster indicates that the first image and the second image are different images but part of the same cluster, and, wherein a second value of the distance and a second diversity factor compared with the type of the cluster indicates that the first image and the second image are different images with characteristics placing the different images in the different clusters, wherein the first image and the second image are shown at different angles and wherein the type of cluster is one of a plurality of types of clusters available for categorization of the first image and the second image.

2. The computer-implemented method of claim 1, further comprising:
obtaining, by the electronic device, a third image having a similarity between the third image and the first image, or between the third image and the second image, less than a second similarity; and
training, by the electronic device, the neural network based on the third image and such that a distance between a third vector generated from the third image in the trained neural network and at least one of the first vector or the second vector is greater than a second distance threshold.

3. The computer-implemented method of claim 2, wherein the obtaining the third image having the similarity between the third image and the first image, or between the third image and the second image, being less than a second similarity comprises: selecting the third image irrespective of the object.

4. The computer-implemented method of claim 1, wherein the selecting the first image and the second image having the similarity greater than a first similarity further comprises:
extracting, by the electronic device, a first set of feature points and a second set of feature points from a first candidate image and a second candidate image, respectively;
performing, by the electronic device, point alignment among the extracted first set of feature points and the second set of feature points; and
determining, by the electronic device, the first candidate image and the second candidate image as the first image and the second image, respectively in response to a graph match between the first candidate image and the second candidate image based on the point alignment.

5. The computer-implemented method of claim 1, wherein the obtaining the first image and the second image further comprises selecting the first image and the second image having the similarity less than a second similarity.

6. An electronic device, comprising: at least one processing unit;
a memory operatively coupled to the at least one processing unit and that stores computer executable instructions that, based on execution by the at least one processing unit, facilitate performance of acts, comprising:
obtaining, based on a similarity between two images, a first image and a second image;
training a neural network based on the first image and the second image, such that a distance between a first and a second vector generated respectively from the first image and the second image in the trained neural network being associated with the similarity, wherein the obtaining comprises selecting the first image and the second images via selecting based on a timeline in a video fragment, the first image and the second image in response to determination of a time difference between the first image and the second image in the video fragment being greater than or equal to a defined period, wherein the obtaining the first image and the second images further comprises selecting the first image and the second image having the similarity greater than a first defined similarity, and wherein the distance between the first vector and the second vector is less than a first distance threshold, the first distance threshold being inversely proportional to the first similarity such that the greater the first similarity, the lesser the distance;
wherein the selecting the first image and the second image having the similarity greater than the first similarity comprises: identifying a plurality of images that include an object and are generated at different viewpoints around the object;
selecting the first image and the second image from the plurality of images, wherein the plurality of images comprises frames included in a video fragment, and the identifying the plurality of images comprises: tracking, by the electronic device, movement of the object in the frames according to the timeline of the video fragment; and
determining that the first vector and the second vector are in a same cluster of a plurality of clusters, wherein the determining that the first vector and the second vector are in the same cluster is based on determining features that exist for the first image and the second image the type of the cluster, the distance between the first vector and the second vector are within a defined set of values that are within the scope of the cluster, and a diversity factor for the first image and the second image, wherein a first value of the distance and a first diversity factor compared with the type of the cluster indicates that the first image and the second image are different images but part of the same cluster, and, wherein a second value of the distance and a second diversity factor compared with the type of the cluster indicates that the first image and the second image are different images with characteristics placing the different images in different clusters, wherein the first image and the second image are shown at different angles and wherein the type of cluster is one of a plurality of types of clusters available for categorization of the first image and the second image.

7. The electronic device of claim 6, wherein the acts further comprise:
obtaining a third image having a similarity between the third image and the first image, or between the third image and the second image, below a second similarity; and
training the neural network based on the third image such that a distance between a third vector generated from the third image in the trained neural network and at least one of the first vector or the second vector is greater than or equal to a second distance threshold.

8. The electronic device of claim 6, wherein the selecting the first image and the second image having the similarity above the first similarity further comprises:
extracting a first set of feature points and a second set of feature points from a first candidate image and a second candidate image, respectively;
performing point alignment among the extracted first set of feature points and the second set of feature points; and
determining the first candidate image and the second candidate image as the first image and the second image, respectively in response to a graph match between the first candidate image and the second candidate image based on the point alignment.

9. A non-transitory computer program product for neural network training, the computer program product comprising a computer readable storage medium having program instructions embodied therewith, the program instructions executable by an electronic device to cause the electronic device to:

obtain, by the electronic device, based on a similarity between two images, a first image and a second image;

train, by the electronic device, a neural network based on the first image and the second image such that a distance between a first vector and a second vector generated, respectively from the first image and the second image in the trained neural network is associated with the similarity, wherein obtaining comprises selecting the first image and the second images via selecting based on a timeline in a video fragment, the first image and the second image in response to determination of a time difference between the first image and the second image in the video fragment being greater than or equal to a defined period;

select the first image and the second image having the similarity greater than the first similarity, wherein the distance between the first vector and the second vector is less than a first distance threshold, the first distance threshold being inversely proportional to the first similarity such that the greater the first similarity, the lesser the distance;

identify a plurality of images that include an object and are generated at different viewpoints around the object;

select the first image and the second image from the plurality of images, wherein the plurality of images comprises frames included in a video fragment, and the identifying the plurality of images comprises: tracking, by the electronic device, movement of the object in the frames according to the timeline of the video fragment;

and determine, by the electronic device, that the first vector and the second vector are in a same cluster of a plurality of clusters, wherein the determining that the first vector and the second vector are in the same cluster is based on determining features that exist for the first image and the second image, the type of the cluster, the distance between the first vector and the second vector are within a defined set of values that are within the scope of the cluster, and a diversity factor for the first image and the second image, wherein a first value of the distance and a first diversity factor compared with the type of the cluster indicates that the first image and the second image are different images of the same object and part of the same cluster and wherein a second value of the distance and a second diversity factor compared with the type of the cluster indicates that the first image and the second image are different images with characteristics placing the different images in different clusters, wherein the first image and the second image are shown at different angles and wherein the type of cluster is one of a plurality of types of clusters available for categorization of the first image and the second image.

10. The non-transitory computer program product of claim 9, the program instructions further executable by the electronic device to cause the electronic device to:

obtain a third image having a similarity between the third image and the first image, or between the third image and the second image, less than a second similarity; and train the neural network based on the third image such that a distance between a third vector generated from third image in the trained neural network and at least one of the first vector or the second vector is greater than or equal to a second distance threshold.

11. The computer-implemented method of claim 1, a diversity factor indicates a numerical difference degree between content of the first image and the second image.

* * * * *